3,004,008
MANUFACTURE OF COPOLYMERIC PRODUCTS

Albert S. Carpenter, Sutton Coldfield, Birmingham, England, assignor to Courtaulds Limited, London, England, a British company
No Drawing. Filed Jan. 21, 1959, Ser. No. 788,045
Claims priority, application Great Britain Feb. 18, 1958
7 Claims. (Cl. 260—85.5)

This invention relates to the manufacture of copolymeric products and is particularly concerned with the manufacture of copolymers of acrylonitrile and vinylidene chloride which are soluble in acetone to give solutions capable of being wet or dry spun to form threads and like filamentary products and films.

British patent specification No. 569,182 describes a process for making copolymers of asymmetrical dichloroethylene, which will be referred to in this specification as vinylidene chloride, and acrylonitrile in which the acrylonitrile comprises 5 to 50 percent by weight of the combined weight of the two monomers; examples are given using bulk, emulsion and suspension polymerisation and it is also stated in the specification that the polymerisation of the two monomers may be effected in a medium which is a solvent for the monomer mixture but a non-solvent for the polymer, mixtures of water and lower aliphatic alcohols being suitable solvents.

British patent specification No. 643,198 describes a process for making acetone-soluble copolymers of vinylidene chloride and acrylonitrile by carrying out the polymerisation of the two monomers in aqueous emulsion or suspension, the initial ratio of water to total monomers being between 5:1 and 10:1 by weight and the initial molar ratio of vinylidene chloride to acrylonitrile being between 3:1 and 1:3.

According to the present invention, a process for the production of fibre-forming acetone-soluble copolymers of acrylonitrile and vinylidene chloride comprises polymerising a mixture containing from 30 to 65 weight percent of acrylonitrile and from 70 to 35 weight percent of vinylidene chloride in the presence of a polymerisation initiator, both monomers and the initiator being dissolved in a solvent mixture containing (a) water, (b) a water-miscible aliphatic alcohol and (c) acetic acid, acetone or a mixture of acetone and acetic acid, the solvent mixture containing at least 15 percent and preferably at least 20 percent by volume of each of the ingredients a, b and c.

Investigations which I have carried out on the production of acetone-soluble acrylonitrile-vinylidene chloride copolymers by the emulsion and suspension methods have shown surprising variations in polymers having the same overall composition. Such variations, I believe, arise from the fact that while vinylidene chloride is virtually insoluble in water, acrylonitrile has appreciable solubility in water. The emulsion or suspension systems consist therefore of dispersed phases containing initially all of the vinylidene chloride and some of the acrylonitrile, and continuous phases which consist of a solution of the remainder of the acrylonitrile in water. Polymerisation in such systems would tend to produce two species of polymer, namely a polyacrylonitrile in the continuous phases and a copolymer in the disperse phases, and the variations in the polymers arise from the uneven distribution of the monomer components between the constituent molecules.

In the present invention I avoid such uneven distribution by carrying out the copolymerisation in solution. I have found that by using a simple aqueous alcoholic solution as a solvent medium the molecular weight of the copolymer as shown by the intrinsic viscosity tends to be rather low whatever the proportion of initiator used, the low intrinsic viscosities being presumably due to the fact that alcohols act as mild chain transfer agents. I have further found that by adding a substantial proportion of either acetone or acetic acid, or a mixture of the two, to the solvent mixture a substantial increase in molecular weight was obtained and the copolymers produced from such mixed solvents are more suitable for making fibres.

The particular solvent mixture used should be chosen so that a homogeneous solution is obtained when it is mixed with the monomers in the selected proportions. Provided this precaution is observed there is a wide range of suitable solvent mixtures and in general mixtures of 100 volumes of water with from 75 to 150 volumes of ethanol and from 75 to 150 volumes of acetic acid or acetone or acetic acid-acetone can be used in this invention. The molecular weight of the product can be controlled by varying the proportion of acetic acid or acetone, the higher the proportion used, the higher being the intrinsic viscosity of the copolymer.

Specific mixtures, in parts by volume, which have been satisfactory for the present invention are mixtures of 40 volumes of water, 30 volumes of ethanol and 30 volumes of acetic acid or acetone; 40 volumes of water, 60 volumes of ethanol and 30 volumes of acetic acid or acetone (corresponding to 31:46:23 volume percent); 40 volumes of water, 30 volumes of ethanol and 60 volumes of acetic acid or acetone (31:23:46) and 40 volumes of water, 60 volumes of ethanol and 60 volumes of acetic acid (corresponding to 25:37.5:37.5 volume percent). All these mixtures will tolerate at least 40 percent by weight of a 2:1 mixture by volume of acrylonitrile and vinylidene chloride.

The preferred alcohol for use in this invention is ethanol but other water miscible alcohols such as methanol, propanol, isopropanol, and tertiary butanol may be used; for example the parts of ethanol given in the preceding paragraph may be replaced by the same number of parts of methanol, propanol, isopropanol or tertiary-butanol.

The initiator used in carrying out the present invention must be water-soluble so that it will dissolve in the mixed solvent. It should also contain an oxidising agent capable of giving rise to free radicals. The preferred initiator is one of the reduction-oxidation system type, generally known as the redox type, as such initiators can be used at temperatures below the boiling point of vinylidene chloride; specific examples of redox initiators for use in the invention are ammonium persulphate/potassium metabisulphite and sodium chlorate/potassium metabisulphite. Other oxidising catalysts may, however, be used, for example hydrogen peroxide, ammonium persulphate, tertiary butyl hydroperoxide and sodium perborate; with such catalysts, it may be necessary, in view of the low boiling point of vinylidene chloride, to use a closed polymerisation system.

When using redox systems as initiators I have found it advantageous to use such systems in conjunction with salts of metals such as copper or silver which are known to function as activators in the polymerisation. The metal salt is conveniently dissolved in the solution of the monomers in the mixed solvent and the redox initiator is then added slowly to the solution to bring about the polymerisation; the addition may be made continuously or intermittently. With redox initiators it is preferred to use acetic acid on its own as the third component of the solvent mixture.

As already indicated the process of the invention is applicable to mixtures containing from 30 to 65 percent by weight of acrylonitrile and the process is particularly useful for preparing copolymers containing at least 45 percent by weight of acrylonitrile although the invention is not limited to the production of such copolymers.

In carrying out this invention it is preferred to stop the polymerisation when only a relatively small proportion, namely 20 to 40 percent by weight, of the monomers have undergone polymerisation. Polymerisation may be stopped by adding aqueous sodium nitrite solution or oxygenated water to the polymerisation system. With such low conversions the copolymer can be readily separated by filtration and the unused monomers and solvent can be recovered from the filtrate without any difficulty.

The proportion of acrylonitrile in the copolymer obtained is generally slightly less than the proportion in the mixture of monomers before the polymerisation.

The invention is illustrated by the following examples:

Example 1

A charge consisting of—

444 cc. of freshly distilled vinylidene chloride (44 weight percent)
888 cc. of acrylonitrile (56 weight percent)
800 cc. of glacial acetic acid
800 cc. of 74 O.P. ethanol
1067 cc. of distilled water
3.94 grams of ammonium persulphate, and
1.97 grams of potassium metabisulphite was placed in a stainless steel packeted vessel fitted with a stirrer and allowed to react under an atmosphere of carbon dioxide for 1 hour at 28 to 30° C. The reaction mixture was poured into 4 litres of tap water and stirred. The precipitated copolymer was filtered off, washed with aqueous alcohol (2:1) and water and finally dried in air. The yield was 433 grams of copolymer in granular form; it contained 49 weight percent of acrylonitrile and its intrinsic viscosity was 2.05. Intrinsic viscosity was calculated from the viscosity of an approximately 0.5 percent by weight solution in dimethyl formamide according to the formula—

$$\text{I.V.} = \frac{2.303 \log_{10} \frac{t_1}{t_2}}{c}$$

where $c$ is the actual concentration in grams/100 cc. of solution, $t_1$ is the flow-time for the solution and $t_2$ the flow-time for the solvent measured using an Ostwald type of viscometer.

The copolymer dissolved readily in acetone to give homogeneous clear solutions suitable for dry spinning.

Example 2

The 800 cc. of glacial acetic acid in Example 1 was replaced by 800 cc. of acetone, the procedure being that set out in the example. In this case the intrinsic viscosity of the product was a little lower, being in the range of 1.7 to 1.9.

Example 3

A solution consisting of—

150 cc. of acrylonitrile (66 weight percent)
50 cc. of vinylidene chloride (34 weight percent)
200 cc. of water
200 cc. of ethanol
250 cc. of acetic acid
0.8 gram of ammonium persulphate, and
0.4 gram of potassium metabisulphite prepared with the exclusion of atmospheric oxygen, was allowed to polymerise for 10 minutes at 25° C. The polymeric product was filtered off, washed with ethanol and with water, and dried in an oven at 50° C. The product had a nitrogen content, determined by the Kjeldahl method of 16.4 percent, indicating an acrylonitrile content of 62.6 weight percent. One part of the polymer dissolved readily in 16 parts of acetone to give a clear homogeneous solution suitable for wet or dry spinning.

Example 4

A charge consisting of—

10 litres of vinylidene chloride (freshly distilled)
20 litres of acrylonitrile
18 litres of ethanol (74 O.P.)
18 litres of glacial acetic acid
24 litres of water, and
6 grams of cupric acetate was placed in a stainless steel jacketed vessel fitted with a high-speed stirrer. Polymerisation was started at 28–30° C. under an atmosphere of carbon dioxide by adding 5 percent of each component of a redox initiator consisting of (a) 100 grams of ammonium persulphate dissolved in 1 litre of water and (b) 50 grams of potassium metabisulphite dissolved in 1 litre of water.

Further small quantities of the initiator solutions $a$ and $b$ were added intermittently to continue the polymerisation, the additions being so made that the reaction was maintained although the temperature of the charge was not allowed to exceed 30° C. by circulating chilled water through the reactor jacket.

When polymerisation had proceeded for 5½ hours, the reaction mixture was diluted with 24 litres of water containing about 1 percent of a wetting agent and the creamy slurry produced was centrifuged to give a polymer paste. This was washed thoroughly with water in the centrifuge and the paste was dried at 60° C. for 48 hours in an air oven. The product contained 46.5 percent by weight of acrylonitrile, had an intrinsic viscosity of 1.45 and was readily soluble in acetone to give a clear homogeneous solution which was dry spun on standard cellulose acetate dry spinning equipment, to form fibres.

What I claim is:

1. A process for the production of fibre-forming, acetone-soluble copolymers of acrylonitrile and vinylidene chloride which comprises polymerising a mixture containing from 30 to 65 percent by weight of acrylonitrile and from 70 to 35 percent by weight of vinylidene chloride in the presence of a polymerisation initiator, both monomers and the initiator being dissolved in a solvent mixture containing (a) water, (b) a water-miscible alcohol and (c) a third component chosen from the group consisting of acetone, acetic acid and mixtures of acetone and acetic acid, the solvent mixture containing at least 15 percent by volume of each of the components $a$, $b$ and $c$.

2. A process as claimed in claim 1 wherein the solvent mixture contains at least 20 per cent by volume of each of the components $a$, $b$ and $c$.

3. A process as claimed in claim 1 wherein the polymerisation initiator used is a reduction-oxidation type of initiator.

4. A process for the production of fibre-forming, acetone-soluble copolymers of acrylonitrile and vinylidene chloride which comprises polymerising a mixture containing from 30 to 65 percent by weight of acrylonitrile and from 70 to 35 percent by weight of vinylidene chloride in the presence of a polymerisation initiator, both monomers and the initiator being dissolved in a solvent mixture containing (a) water, (b) ethanol and (c) a third component chosen from the group consisting of acetone, acetic acid and mixtures of acetone and acetic acid, the solvent mixture containing at least 20 percent by volume of each of the components $a$, $b$, and $c$.

5. A process for the production of fibre-forming, acetone-soluble copolymers of acrylonitrile and vinylidene chloride which comprises polymerising a mixture containing from 30 to 65 percent by weight of acrylonitrile and from 70 to 35 percent by weight of vinylidene chloride in the presence of a polymerisation initiator, both monomers and the initiator being dissolved in a solvent mixture containing (*a*) water (*b*) ethanol and (*c*) acetic acid, the solvent mixture containing at least 20 percent by volume of each of the components *a*, *b* and *c*.

6. A process as claimed in claim 5 wherein the polymerisation initiator used is a reduction-oxidation type of initiator.

7. A process as claimed in claim 6 wherein the redox initiator used is a mixture of ammonium persulphate and potassium metabisulphite.

References Cited in the file of this patent

UNITED STATES PATENTS

| | | |
|---|---|---|
| 2,407,946 | Britton et al. | Sept. 17, 1946 |
| 2,468,664 | Hanford et al. | Apr. 26, 1949 |
| 2,843,572 | Wooten et al. | July 15, 1958 |

FOREIGN PATENTS

| | | |
|---|---|---|
| 622,481 | Great Britain | May 3, 1949 |